(No Model.)
J. G. WENNINGER.
NUT LOCK.
No. 427,718. Patented May 13, 1890.
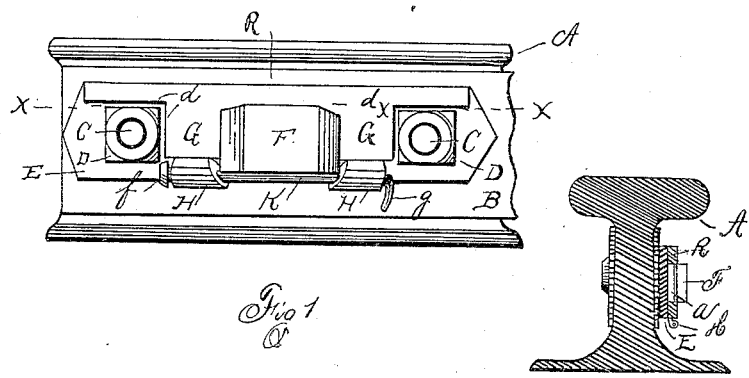
Fig. 1
Fig. 4
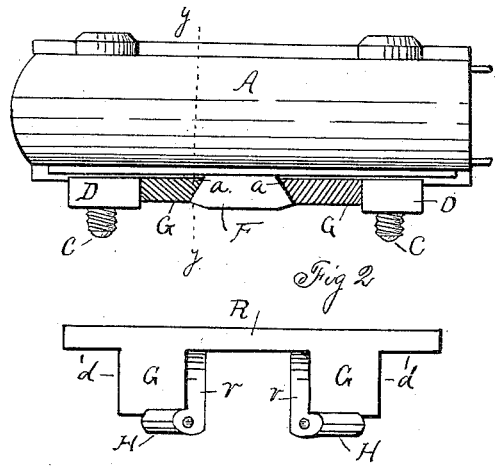
Fig. 2
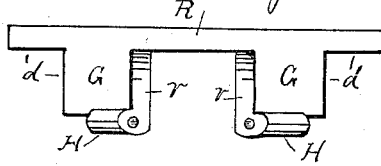
Fig. 3
WITNESSES
H. K. Diffenderfer
Geo. A. Laue
INVENTOR
John G. Wenninger
By Wm. R. Gerhart
Atty.

UNITED STATES PATENT OFFICE.

JOHN G. WENNINGER, OF LANCASTER, PENNSYLVANIA.

NUT-LOCK.

SPECIFICATION forming part of Letters Patent No. 427,718, dated May 13, 1890.

Application filed February 13, 1890. Serial No. 340,306. (No model.)

*To all whom it may concern:*

Be it known that I, JOHN G. WENNINGER, a citizen of the United States, residing in Lancaster, in the county of Lancaster and State of Pennsylvania, have invented certain Improvements in Nut-Locks, of which the following is a specification.

This invention relates to improvements in nut-locks; and the object of my improvement is to provide for use in connection with railroads a simple, durable, and efficient fastening for securing the fish-plate nuts from turning in consequence of the vibrations of the rails, and thus allow the bolts to work out, reference being had to the accompanying drawings, forming part of this specification, in which—

Figure 1 is a side elevation showing the application of my invention to adjacent nuts of a fish-plate. Fig. 2 is a plan view of the same, the locking-bar being shown in section on the line $x\ x$, Fig. 1. Fig. 3 is a side elevation of the locking-bar detached. Fig. 4 is a vertical transverse section on the line $y\ y$.

Similar letters of reference indicate like parts throughout the several views.

The invention consists in certain details of construction, which will be hereinafter more fully described, and pointed out in the claims.

Referring to the details of the drawings, A represents a railway-rail; B, a fish-plate; C, the bolt, and D the nuts on the bolts C C.

E represents a washer fitting over the adjacent bolts C C and resting against the fish-plate.

F is a lug projecting from the washer E between the bolts C C. This lug is recessed on the opposite vertical sides, as shown at $a\ a$, the front edges of which recesses are beveled.

R is a locking-bar, which extends across and rests upon the adjacent nuts D. Between each nut D and the lug F there is a dependent lip G, the sides $d$ of which, toward the nuts, are shaped to meet and engage the sides of said nuts, while the sides $r$ are shaped to engage the recesses $a\ a$ of the lug F. The lips G are provided on their under edges with eyes H, the openings through which lie below the lower edge of the lug F. Through the eyes H a locking-pin K is passed, one end of which is provided with a head $f$ and the other turned down to clinch the parts together, as shown at $g$, Fig. 1. The pin K is preferably made of malleable iron, so that the end $g$ may be turned down or bent upward. If preferable, the lug F may be formed directly on the fish-plate B, the other corresponding parts being fitted thereto in the same way as though the washer E were used.

The operation of my device is very simple. The nuts are screwed home, the locking-bar is placed over the same, the lips G extending downward between said nuts and the adjacent sides of the lug F, and the locking-pin K inserted, and the end $g$ turned down.

Having thus described my invention, what I claim as new, and desire to secure by Letters Patent, is—

1. The combination, with the nuts, of a locking-bar having dependent lips adapted to engage the nuts and provided with eyes at their lower ends, a lug adapted to be engaged by the said lips and hold the locking-bar in position horizontally, and a pin adapted to engage said eyes, substantially as specified.

2. The combination, with the nuts, of a lug F, provided with recesses in its vertical sides, a locking-bar R, which rests upon the nuts and is provided with dependent lips G, adapted to engage the recesses in the sides of the lug F, eyes H, formed on the lips G, and a locking-pin adapted to engage the eyes H, substantially as specified.

JOHN G. WENNINGER.

Witnesses:
GEO. A. LANE,
WM. R. GERHART.